(12) United States Patent
Nozuki et al.

(10) Patent No.: US 11,782,430 B2
(45) Date of Patent: Oct. 10, 2023

(54) ABNORMALITY DIAGNOSIS METHOD, ABNORMALITY DIAGNOSIS DEVICE AND NON-TRANSITORY COMPUTER READABLE STORAGE MEDIUM

(71) Applicant: Mitsubishi Electric Corporation, Tokyo (JP)

(72) Inventors: Misa Nozuki, Tokyo (JP); Shinsuke Miki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/801,796

(22) PCT Filed: Apr. 27, 2020

(86) PCT No.: PCT/JP2020/018005
§ 371 (c)(1),
(2) Date: Aug. 24, 2022

(87) PCT Pub. No.: WO2021/220358
PCT Pub. Date: Nov. 4, 2021

(65) Prior Publication Data
US 2023/0081892 A1    Mar. 16, 2023

(51) Int. Cl.
*G05B 23/02* (2006.01)
(52) U.S. Cl.
CPC ..... *G05B 23/0235* (2013.01); *G05B 23/0221* (2013.01)
(58) Field of Classification Search
CPC ............ G05B 23/024; G05B 19/41875; G05B 23/021; G05B 23/0235; G05B 23/0254; G05B 23/0281; G06N 20/00
See application file for complete search history.

(56) References Cited

U.S. PATENT DOCUMENTS 11,120,033 B2 *   9/2021   Xu ...................... G06F 11/0709
11,215,535 B2 *   1/2022   Huang .................. B25J 9/1674
(Continued)

FOREIGN PATENT DOCUMENTS

JP          61-62108 A     3/1986
JP           8-6635 A      1/1996
(Continued)

OTHER PUBLICATIONS

Li et al. , A novel data—temporal attention network based strategy for fault diagnosis of chiller sensors (Year: 2019).*
(Continued)

*Primary Examiner* — Mohammad K Islam
(74) *Attorney, Agent, or Firm* — XSENSUS LLP

(57) ABSTRACT

An abnormality diagnosis method for diagnosing an abnormality in equipment includes acquiring multivariate time-series data for a plurality of measurement items from the equipment, diagnosing an abnormality in operational state of the equipment based on the multivariate time-series data, and diagnosing a cause of the abnormality. The diagnosing a cause of the abnormality includes extracting a feature of a first section before the occurrence of the abnormality from the multivariate time-series data of the first section, extracting a feature of a second section after the occurrence of the abnormality from the multivariate time-series data of the second section, obtaining an amount of change in feature from a difference between the feature of the first section and the feature of the second section, and diagnosing a measurement item that is the cause of the abnormality based on the amounts of change in features of the plurality of measurement items.

19 Claims, 9 Drawing Sheets

(56) References Cited

U.S. PATENT DOCUMENTS

| | | | |
|---|---|---|---|
| 11,625,032 B2* | 4/2023 | Basak | G05B 23/0283 |
| | | | 702/183 |
| 2007/0299798 A1* | 12/2007 | Suyama | G06F 17/18 |
| | | | 706/21 |
| 2012/0191633 A1* | 7/2012 | Liu | E21B 47/008 |
| | | | 706/12 |
| 2012/0290879 A1 | 11/2012 | Shibuya et al. | |
| 2019/0018402 A1 | 1/2019 | Enomoto et al. | |
| 2019/0057307 A1* | 2/2019 | Zheng | G06N 3/044 |
| 2019/0219994 A1* | 7/2019 | Yan | G05B 13/027 |
| 2019/0226943 A1 | 7/2019 | Hayashi et al. | |
| 2019/0354836 A1* | 11/2019 | Shah | G06N 3/045 |
| 2019/0391574 A1* | 12/2019 | Cheng | G06N 3/044 |
| 2020/0074275 A1* | 3/2020 | Xia | G06N 3/045 |
| 2020/0097810 A1* | 3/2020 | Hetherington | G06N 20/20 |
| 2020/0104200 A1* | 4/2020 | Kocberber | G06N 3/082 |
| 2020/0198128 A1* | 6/2020 | Hatanaka | G05B 23/024 |
| 2020/0210824 A1* | 7/2020 | Poornaki | G05B 23/0221 |
| 2021/0133018 A1* | 5/2021 | Chakraborty | G06F 11/0769 |
| 2022/0066431 A1* | 3/2022 | Mitani | G05B 23/024 |

FOREIGN PATENT DOCUMENTS

| | | |
|---|---|---|
| JP | 2010-191641 A | 9/2010 |
| JP | 2015-172945 A | 10/2015 |
| JP | 2017-120504 A | 7/2017 |
| JP | 2018-92511 A | 6/2018 |
| JP | 2019-21305 A | 2/2019 |
| JP | 2019-128704 A | 8/2019 |
| WO | 2016/174735 A1 | 11/2016 |

OTHER PUBLICATIONS

Zhao et al, Assessment of data suitability for Machine prognosis using maximum mean discrepancy, IEEE (Year: 2018).*

Baek et al, Fault Prediction via Symptom Pattern Extraction Using the Discretized State Vectors of Multi sensor Signals, IEEE (Year: 2019).*

International Search Report and Written Opinion dated Jul. 28, 2020, received for PCT Application PCT/JP2020/018005, filed on Apr. 27, 2020, 9 pages including English Translation.

* cited by examiner

FIG.7

|  | VOLTAGE | CURRENT | WINDING TEMPERATURE | GAS TEMPERATURE | BEARING METAL TEMPERATURE | SHAFT VIBRATION |
|---|---|---|---|---|---|---|
| ABNORMAL PHENOMENON a | 1 | 1 | 1 | 1 | 0 | 4 |
| ABNORMAL PHENOMENON b | 0 | 0 | 1 | 1 | 0 | 0 |
| ABNORMAL PHENOMENON c | 0 | 0 | 0 | 4 | 0 | 1 |
| ABNORMAL PHENOMENON d | 0 | 1 | 1 | 0 | 0 | 0 |
| ABNORMAL PHENOMENON e | 3 | 3 | 1 | 0 | 1 | 1 |
| ABNORMAL PHENOMENON f | 0 | 0 | 2 | 2 | 0 | 0 |
| ... | ... |  |  |  |  |  |

FIG.8

| | VOLTAGE | CURRENT | WINDING TEMPERATURE | GAS TEMPERATURE | BEARING METAL TEMPERATURE | SHAFT VIBRATION | DEGREE OF SIMILARITY TO CHANGE AMOUNT VECTOR |
|---|---|---|---|---|---|---|---|
| ABNORMAL PHENOMENON a | 1 | 1 | 1 | 1 | 0 | 4 | |
| ABNORMAL PHENOMENON b | 0 | 0 | 1 | 1 | 0 | 0 | |
| ABNORMAL PHENOMENON c | 0 | 0 | 0 | 4 | 0 | 1 | |
| ABNORMAL PHENOMENON d | 0 | 1 | 1 | 0 | 0 | 0 | |
| ABNORMAL PHENOMENON e | 3 | 3 | 1 | 0 | 1 | 1 | |
| ABNORMAL PHENOMENON f | 0 | 0 | 2 | 2 | 0 | 0 | |
| ... | ... | | | | | | |

ABNORMALITY DIAGNOSIS METHOD, ABNORMALITY DIAGNOSIS DEVICE AND NON-TRANSITORY COMPUTER READABLE STORAGE MEDIUM

CROSS-REFERENCE TO RELATED APPLICATION

The present application is based on PCT filing PCT/JP2020/018005, filed Apr. 27, 2020, the entire contents of which are incorporated herein by reference.

TECHNICAL FIELD

The present disclosure relates to an abnormality diagnosis method, an abnormality diagnosis device, and an abnormality diagnosis program.

BACKGROUND ART

In order to monitor a state of equipment, multivariate time-series data containing various operation data of equipment and apparatus and measurement data obtained by measuring vibrations generated from the apparatus, a temperature of the apparatus, and the like using various sensors is used. Analyzing the multivariate time-series data acquired from the equipment that is a diagnosis subject makes it possible to determine whether the equipment and the apparatus are in normal operation. For example, under a Mahalanobis Taguchi (MT) method, one analysis output value is calculated from the multivariate time-series data, and whether the equipment is abnormal is determined using the analysis output value.

When it is determined that the equipment is abnormal based on the above-described analysis, a technique for analyzing which measurement item is the cause of the abnormality and what kind of abnormal phenomenon (abnormality mode) occurs in the equipment is further required.

For example, Japanese Patent Laying-Open No. H8-6635 (PTL 1) discloses, as a method for identifying an abnormality cause, a method for identifying an abnormality cause by comparing actual measurement data acquired from each apparatus of plant that is a diagnosis subject with pseudo data obtained using a physical model. Under this method, changing an operation parameter of the physical model based on failure mode evaluation analysis information on apparatus prepared in advance causes the pseudo data to change. Then, when the actual measurement data and the pseudo data coincide with each other, the failure mode is determined to be correct.

Further, Japanese Patent Laying-Open No. 2015-172945 (PTL 2) discloses, as a method for identifying an abnormality mode, a method in which a matrix of frequencies of combinations of a cause event and an effect event is created using, as the cause event, vector-quantized measurement values of various measurement items at a time when an abnormality is determined, and using, as the effect event, a failure event that has occurred from the time until a certain time elapses. Under this method, a distance between a vector-quantized measurement value at an abnormality occurrence time and a cause event is calculated, a cause event having the shortest distance is extracted, and an effect event having the highest frequency is extracted.

CITATION LIST

Patent Literature

PTL 1: Japanese Patent Laying-Open No. H8-6635
PTL 2: Japanese Patent Laying-Open No. 2015-172945

SUMMARY OF INVENTION

Technical Problem

Under the method disclosed in PTL 1, however, in order to perform simulation based on a physical model to identify an abnormality cause and an abnormality mode when a phenomenon is reproduced, specialized knowledge and skills for apparatus that is a diagnosis subject are required. Therefore, a person who is unfamiliar with the apparatus that is the diagnosis subject may make an erroneous diagnosis. Further, when there are a plurality of inferred abnormality causes, it may take time to identify the abnormality cause and the abnormality mode. For this reason, there is a concern that the effectiveness is lowered in an abnormal situation where every second counts.

On the other hand, as disclosed in PTL 2, under a method in which a database is created based on events that have actually occurred, and an abnormality mode is identified based on a distance from each event registered in the database, it is difficult for equipment in which an abnormality rarely occurs to enrich the database, which may cause the abnormality mode to be erroneously determined.

The present disclosure has been made to solve such problems, and it is therefore an object of the present disclosure to clearly indicate a measurement item causing an abnormality with high accuracy in a short time without requiring specialized knowledge and skills for equipment and apparatus that is a diagnosis subject. It is another object of the present disclosure to identify an abnormal phenomenon that is an abnormality mode with high accuracy in a short time without requiring specialized knowledge and skills for the diagnosis subject.

Solution to Problem

An abnormality diagnosis method according to a first aspect of the present disclosure is an abnormality diagnosis method for diagnosing an abnormality in equipment that is a diagnosis subject, the abnormality diagnosis method including acquiring multivariate time-series data for a plurality of measurement items from the equipment, diagnosing an abnormality in operational state of the equipment based on the multivariate time-series data, and diagnosing, when the abnormality in the operational state of the equipment is determined in the diagnosing an abnormality, a cause of the abnormality. The diagnosing a cause of the abnormality includes extracting a feature of a first section before the occurrence of the abnormality from the multivariate time-series data of the first section for each of the measurement items by at least one feature extraction method, extracting a feature of a second section after the occurrence of the abnormality from the multivariate time-series data of the second section for each of the measurement items by the at least one feature extraction method, obtaining an amount of change in feature from a difference between the feature of the first section and the feature of the second section which am obtained by a common feature extraction method, and diagnosing a measurement item that is the cause of the abnormality based on the amounts of change in features of the plurality of measurement items.

An abnormality diagnosis method according to a second aspect of the present disclosure is an abnormality diagnosis method for diagnosing an abnormality in equipment that is a diagnosis subject, the abnormality diagnosis method including acquiring multivariate time-series data for a plurality of measurement items from the equipment, diagnosing an abnormality in operational state of the equipment based on the multivariate time-series data, and diagnosing, when the abnormality in the operational state of the equipment is determined in the diagnosing an abnormality, an abnormality mode indicating a phenomenon of the abnormality. The diagnosing an abnormality mode includes extracting a feature of a first section before the determination of the abnormality from the multivariate time-series data of the first section for each of the measurement items by at least one feature extraction method, extracting a feature of a second section after the determination of the abnormality from the multivariate time-series data of the second section for each of the measurement items by the at least one feature extraction method, obtaining an amount of change in feature from a difference between the feature of the first section and the feature of the second section which are obtained by a common feature extraction method, generating a change amount vector having, as an element, (i) the amount of change in feature of each of the measurement items, (ii) a value obtained using the amount of change in feature in accordance with a predetermined n-level (n is an integer) classification method, or (iii) a value obtained using a plurality of the amounts of change in features extracted by different feature extraction methods from each other in accordance with a predetermined m-level (m is an integer) classification method, creating a database in which each of a plurality of abnormal phenomena and a change amount vector corresponding to the abnormal phenomenon are registered with the abnormal phenomenon and the change amount vector associated with each other, and diagnosing an unknown abnormality mode based on the database and the change amount vector generated in the generating.

Advantageous Effects of Invention

According to the present disclosure, it is possible to clearly indicate a measurement item causing an abnormality with high accuracy in a short time without requiring specialized knowledge and skills for the diagnosis subject. It is further possible to identify an abnormal phenomenon that is an abnormality mode with high accuracy in a short time without requiring specialized knowledge and skills for the diagnosis subject.

BRIEF DESCRIPTION OF DRAWINGS

FIG. 7 is a diagram illustrating an example of a database.

FIG. 8 is a diagram illustrating an output example of a result of determination made by the third output unit.

DESCRIPTION OF EMBODIMENTS

Figure 1:
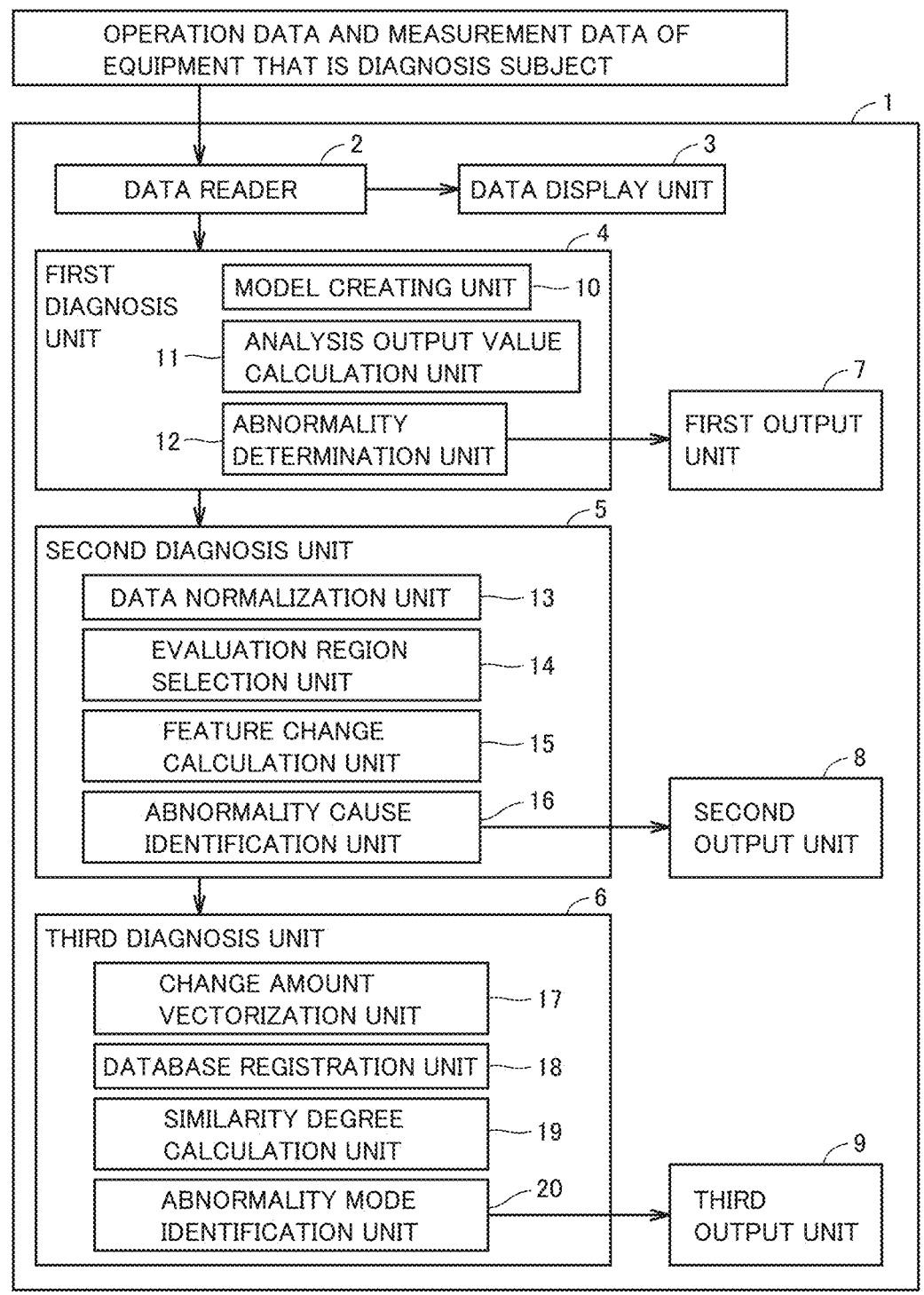
FIG. 1 is a block diagram illustrating a functional structure of an abnormality diagnosis device according to an embodiment.

Hereinafter, embodiments of the present disclosure will be described in detail with reference to the drawings. Note that, in the following description, the same or corresponding parts in the drawings are denoted by the same reference numerals, and no redundant description will be given of such parts in principle.

A. Functional Structure of Abnormality Diagnosis Device

First, a functional structure of an abnormality diagnosis device according to the embodiment will be described.

FIG. 1 is a block diagram illustrating the functional structure of the abnormality diagnosis device according to the embodiment. An abnormality diagnosis device 1 according to the embodiment is structured to analyze multivariate time-series data containing operation data and measurement data acquired from equipment or apparatus that is a diagnosis subject (hereinafter, collectively and simply referred to as "equipment") to determine whether an operational state of the equipment is normal and output a result of the determination.

When the operational state of the equipment that is the diagnosis subject is determined to be abnormal in the above-described determination, abnormality diagnosis device 1 is further structured to diagnose a measurement item that is a cause of the abnormality. Here, the measurement item means an item acquired as the operation data or the measurement data. Abnormality diagnosis device 1 is further structured to diagnose an abnormality mode to which the measurement item contributes.

Examples of the equipment that is the diagnosis subject include apparatus or plant such as a generator, factory automation (FA) apparatus, power receiving and distributing apparatus, an elevator, and railroad electrical apparatus. In the present embodiment, a structure where abnormality diagnosis device 1 is applied to state monitoring and abnormality diagnosis of a generator will be given as an example.

Referring to FIG. 1, abnormality diagnosis device 1 includes a data reader 2, a data display unit 3, a first diagnosis unit 4, a second diagnosis unit 5, a third diagnosis unit 6, a first output unit 7, a second output unit 8, and a third output unit.

(A-1) Data Reader

Data reader 2 reads multivariate time-series data acquired from the equipment that is the diagnosis subject. That is, data reader 2 acquires multivariate time-series data for a plurality of measurement items from the equipment that is the diagnosis subject. Herein, "variate" means measurement items representing various physical quantities acquired from the diagnosis subject. The "multivariate time-series data" is time-series data indicating temporal changes in the plurality of measurement items (multivariate data) associated with each other.

When the generator is described as an example, the measurement items include items related to operation data such as an output, rotation speed, voltage, and current of the generator, and items related to time-series data of measurement data such as a temperature and vibration measured by a sensor group attached to apparatus or components constituting the generator. The measurement items may further include data related to an environment in which the generator is installed, such as an outside air temperature, and operation data and measurement data of equipment related to the operation state of the generator. Note that such measurement items are examples, and the number of measurement items is not limited to a specific number. Time-series data including such a plurality of measurement items is treated as the multivariate time-series data.

(A-2) Data Display Unit

Data display unit 3 graphically displays the multivariate time-series data received from data reader 2.

(A-3) First Diagnosis Unit

First diagnosis unit 4 diagnoses whether the operational state of the equipment that is the diagnosis subject is abnormal using the multivariate time-series data received from data reader 2. That is, first diagnosis unit 4 serves as an "abnormality diagnosis unit" for diagnosing an abnormality in the operational state of the equipment.

First diagnosis unit 4 calculates one analysis output value using the multivariate time-series data. First diagnosis unit 4 determines whether the operational state of the equipment that is the diagnosis subject is abnormal based on the analysis output value thus calculated. As such an abnormality determination method, a known method such as a Mahalanobis-Taguchi (MT)method, a one-class support vector machine, a nearest neighbor method, regression analysis, or a subspace method may be used.

Specifically, first diagnosis unit 4 includes a model creating unit 10, an analysis output value calculation unit 11, and an abnormality determination unit 12.

Model creating unit 10 creates, using the multivariate time-series data as training data, a learned model used for abnormality diagnosis in accordance with a selected abnormality determination method. The learned model can also be referred to as a normal model. Model creating unit 10 is capable of creating a learned model using data obtained by performing any calculation processing (hereinafter, also referred to as "preprocessing") on the multivariate time-series data as necessary. Examples of any calculation processing include a process of calculating a differential value or a moving average value of data of each measurement item, and a process of calculating a sum, a difference, a mean, or the like of data of at least two measurement items.

Analysis output value calculation unit 11 calculates the analysis output value using the created learned model and the multivariate time-series data of the diagnosis subject based on the selected abnormality determination method. Abnormality determination unit 12 compares the analysis output value calculated by the analysis output value calculation unit 11 with a preset threshold for abnormality determination to determine whether the operational state of the equipment that is the diagnosis subject is abnormal.

For example, when the MT method is used as the abnormality determination method, model creating unit 10 creates a unit space based on multivariate time-series data during normal operation or preprocessed data. This unit space corresponds to an example of the "learned model", and serves as a criterion for determining the operational state of the equipment that is the diagnosis subject.

Analysis output value calculation unit 11 calculates a Mahalanobis distance by the MT method using the unit space thus created and the multivariate time-series data of the diagnosis subject read by data reader 2 and subjected to the preprocessing as necessary. The Mahalanobis distance may be calculated by a known method.

Abnormality determination unit 12 compares the Mahalanobis distance thus calculated with the preset threshold to determine whether the operational state of the equipment that is the diagnosis subject is abnormal. When abnormality determination unit 12 determines that there is no abnormality, abnormality diagnosis device 1 causes abnormality determination unit 12 to continue the determination whether there is an abnormality without proceeding to diagnosis of an abnormality cause and an abnormality mode to be described later. On the other hand, when it is determined that there is an abnormality, abnormality diagnosis device 1 performs the diagnosis of an abnormality cause and an abnormality mode.

(A-4) First Output Unit

First output unit 7 outputs a result of the determination made by abnormality determination unit 12 of first diagnosis unit 4. Specifically, first output unit 7 includes, for example, a display unit, and displays the determination result on the display unit. First output unit 7 may be further structured to transmit the determination result to an external device using a communication unit (not illustrated).

(A-5) Second Diagnosis Unit

Second diagnosis unit 5 identifies which measurement item is an abnormality cause (factor) among the plurality of measurement items (variates) included in the multivariate time-series data. That is, second diagnosis unit 5 serves as an "abnormality cause diagnosis unit" for diagnosing a measurement item that is an abnormality cause.

Second diagnosis unit 5 diagnoses an abnormality cause using multivariate time-series data of a first section (time range) corresponding to a normal state before a time at which abnormality determination unit 12 of first diagnosis unit 4 determines that an abnormality has occurred (hereinafter, also referred to as an "abnormality occurrence time") and multivariate time-series data of a second section corresponding to an abnormal state after the abnormality occurrence time.

Note that the multivariate time-series data used for diagnosis by second diagnosis unit 5 may be multivariate time-series data received from data reader 2, or may be data obtained by performing preprocessing on the multivariate time-series data. That is, the "multivariate time-series data" to be described below corresponds to a concept that covers the multivariate time-series data and the data obtained by preprocessing the multivariate time-series data.

Second diagnosis unit 5 extracts, for each measurement item, a feature of the first section from the multivariate time-series data of the first section corresponding to the normal state before the occurrence of the abnormality by at least one feature extraction method. Second diagnosis unit 5 extracts, for each measurement item, a feature of the second section from the multivariate time-series data of the second section corresponding to the abnormal state after the occurrence of the abnormality by at least one feature extraction method. Then, second diagnosis unit 5 calculates, for each measurement item, an amount of change in feature that is a difference between the features of the sections before and after the occurrence of the abnormality obtained by a common feature extraction method. Second diagnosis unit 5 identifies, as an abnormality cause, a measurement item for which the amount of change in feature is greater than the preset threshold among the plurality of amounts of change in features each associated with a corresponding one of the plurality of measurement items.

Figure 2:
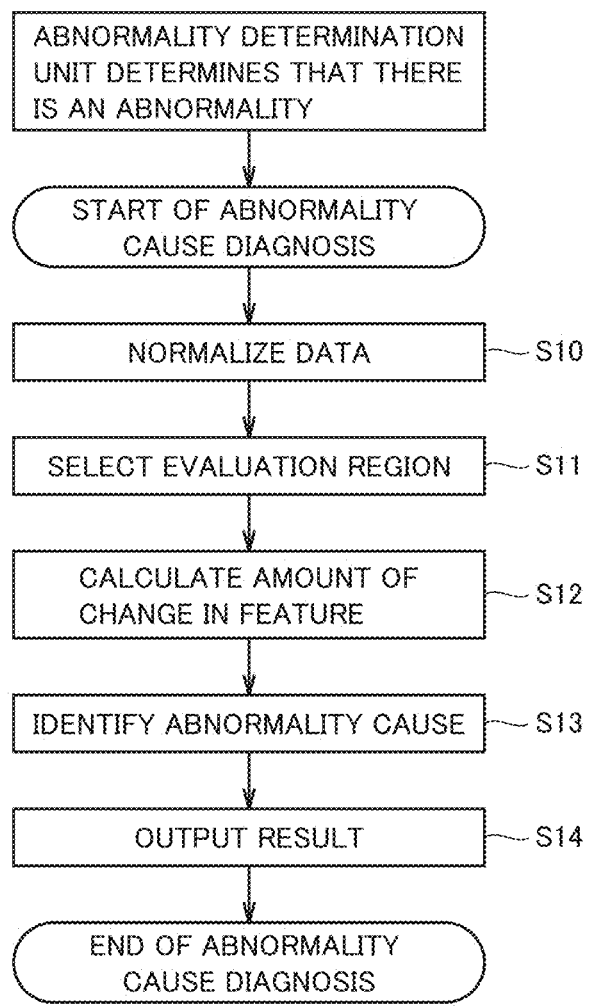
FIG. 2 is a flowchart for describing a process of diagnosing an abnormality cause performed by a second diagnosis unit.

Specifically, second diagnosis unit 5 includes a data normalization unit 13, an evaluation region selection unit 14, a feature change calculation unit 15, and an abnormality cause identification unit 16. FIG. 2 is a flowchart for describing a process of diagnosing an abnormality cause performed by the second diagnosis unit 5. The flowchart illustrated in FIG. 2 is executed when first diagnosis unit 4 (abnormality determination unit 12) determines that the equipment that is the diagnosis subject is abnormal.

When the process of diagnosing an abnormality cause is started, data normalization unit 13 first normalizes the time-series data of each measurement item in the multivariate time-series data in step S10. This is to evaluate the amount of change in feature before and after the abnormality occurrence time of each measurement item under the same condition. A normalization method determined using the multivariate time-series data of the first section before the occurrence of the abnormality can be applied to the multivariate time-series data of the second section after the occurrence of the abnormality.

As a first example of data normalization, data normalization unit 13 can convert data into a dimensionless number with a mean of 0 and a variance of 1 for each measurement item.

Alternatively, as a second example, data normalization unit 13 can convert data into a dimensionless number with a maximum of 1 and a minimum value of 0 for each measurement item.

Alternatively, as a third example, data normalization unit 13 can convert data into a dimensionless number by determining a normalization reference value based on the learned model used in the abnormality determination made by first diagnosis unit 4. For example, when the learned model is a unit space under the MT method, data can be converted into a dimensionless number based on the maximum and minimum of the unit space data of each measurement item, and a determination value determined as desired.

Specifically, a measurement value within a range from the minimum to maximum of the unit space data both inclusive is converted into "0". An upper limit determination value defined for each measurement item is converted into "1", and a lower limit determination value is converted into "−1". Then, a value in a range of −1 to 0, a value in a range of 0 to 1, and a value greater than or equal to 1 or less than or equal to −1 are converted by linear transformation or the like.

The linear transformation can be performed using, for example, a linear expression ($y=ax+b$ where x is a value after transformation, and y is a value before transformation). In a range greater than 0, a linear expression can be created with a slope $a=\{y$ (upper limit determination value)$-y$ (maximum of unit space data)$\}/(1-0)$ and an intercept $b=y$ (maximum of unit space data). In a range less than 0, a linear expression can be created with a slope $a=\{y$ (minimum of unit space data)$-y$ (lower limit determination value)$\}/\{0-(-1)\}$ and an intercept $b=y$ (minimum of unit space data).

Note that the criterion (when the MT method is used as an example, the maximum and minimum of the unit space data) and the transformation expression used for transformation may be updated along with the update of the unit space (or the learned model).

Figure 3:
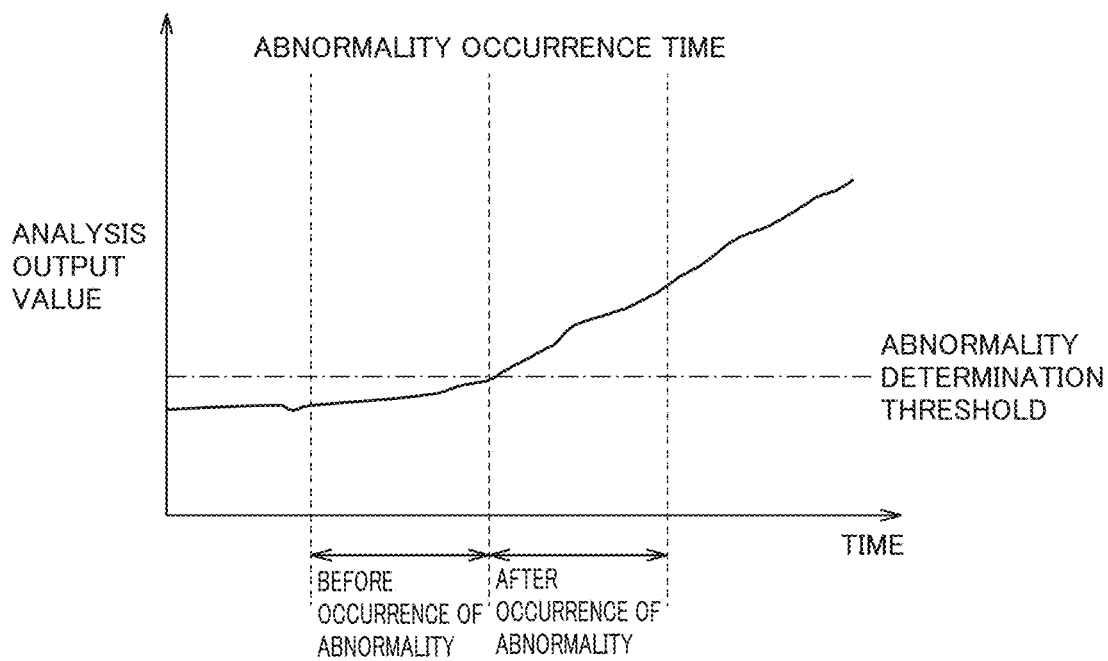
FIG. 3 is a diagram illustrating an example of how an evaluation region is selected.

In step S11 of FIG. 2, in order to compare each measurement item before and after the abnormality occurrence time, evaluation region selection unit 14 determines a section (first section) to be evaluated as "before the occurrence of the abnormality (that is, normal state)" and a section (second section) to be evaluated as "after the occurrence of the abnormality (that is, abnormal state)". FIG. 3 is a diagram illustrating an example of how an evaluation region is selected. FIG. 3 illustrates time-series changes in the analysis output value calculated by first diagnosis unit 4.

As illustrated in FIG. 3, evaluation region selection unit 14 defines a section (normal state) in which the analysis output value indicates a value less than the abnormality determination threshold as a section (first section) before the occurrence of the abnormality, and defines a section (abnormal state) in which the analysis output value indicates a value greater than or equal to the abnormality determination threshold as a section (second section) after the occurrence of the abnormality. Note that the number of pieces of data (time range) of the section before the occurrence of the abnormality and the section after the occurrence of the abnormality may be set as desired. Such two sections are not necessarily contiguous.

In step S12, feature change calculation unit 15 extracts, for each measurement item, a feature of the first section from the multivariate time-series data of the first section before the occurrence of the abnormality or data obtained as a result of the normalization process by at least one feature extraction method. Feature change calculation unit 15 extracts, for each measurement item, a feature of the second section from the multivariate time-series data of the second section after the occurrence of the abnormality or data obtained as result of the normalization process by at least one feature extraction method. Then, feature change calculation unit 15 calculates a difference between the feature of the first section before the occurrence of the abnormality and the feature of the second section after the occurrence of the abnormality obtained by a common feature extraction method, so as to obtain the amount of change in feature. Note that the number of features of each measurement item obtained from each section may be one or more.

Specifically, first, feature change calculation unit 15 calculates at least one feature for each measurement item from the multivariate time-series data of each section. That is, feature change calculation unit 15 extracts at least one feature for each measurement item from the multivariate time-series data of the first section before the occurrence of the abnormality normalized by data normalization unit 13. Feature change calculation unit 15 further extracts at least one feature for each measurement item from the multivariate time-series data of the second section after the occurrence of the abnormality normalized by data normalization unit 13.

Note that any method may be used for extracting a feature. For example, statistics such as a men, a variance, a standard deviation, a median, a mode, a maximum, a minimum, a skewness, and a kurtosis can be obtained. Note that the feature extracted for each measurement item is of the same type.

Next, feature change calculation unit 15 calculates, for each measurement item, a difference in feature between the first section before the occurrence of the abnormality and the second section after the occurrence of the abnormality obtained by a common feature extraction method for each of at least one feature. The difference in feature thus calculated corresponds to the amount of change in feature after the occurrence of the abnormality relative to before the occurrence of the abnormality.

In step S13, abnormality cause identification unit 16 identifies a measurement item that is an abnormality cause based on the amount of change in feature calculated by feature change calculation unit 15. Specifically, abnormality cause identification unit 16 determines that there is no change in data between before the occurrence of the abnormality and after the occurrence of the abnormality for a measurement item for which the amount of change in all of the at least one feature thus obtained are close to zero and thus infers that the measurement item is not an abnormality cause. On the other hand, for a measurement item for which the amount of change in any one of the at least one feature falls outside the preset threshold range, abnormality cause identification unit 16 identifies this measurement item as an abnormality cause.

(A-6) Second Output Unit

In step S14, second output unit 8 outputs a result of the determination made by abnormality cause identification unit 16 of second diagnosis unit 5. Second output unit 8 includes, for example, a display unit, and displays the determination result on the display unit. Second output unit 8 may be further structured to transmit the determination result to an external device using a communication unit (not illustrated). Second output unit 8 displays, for each measurement item, the amount of change in the at least one feature calculated by feature change calculation unit 15. For example, when a result about the amount of change in one feature is displayed, the amount of change in feature of each measurement item can be displayed in the form of a bar graph or the like. Further, a multidimensional graph may be used for displaying a result about the amounts of change in the plurality of features. Each axis of the multidimensional graph represents the amount of change in feature, and a value indicating the amount of change in feature of each measurement item is plotted.

Figure 4:
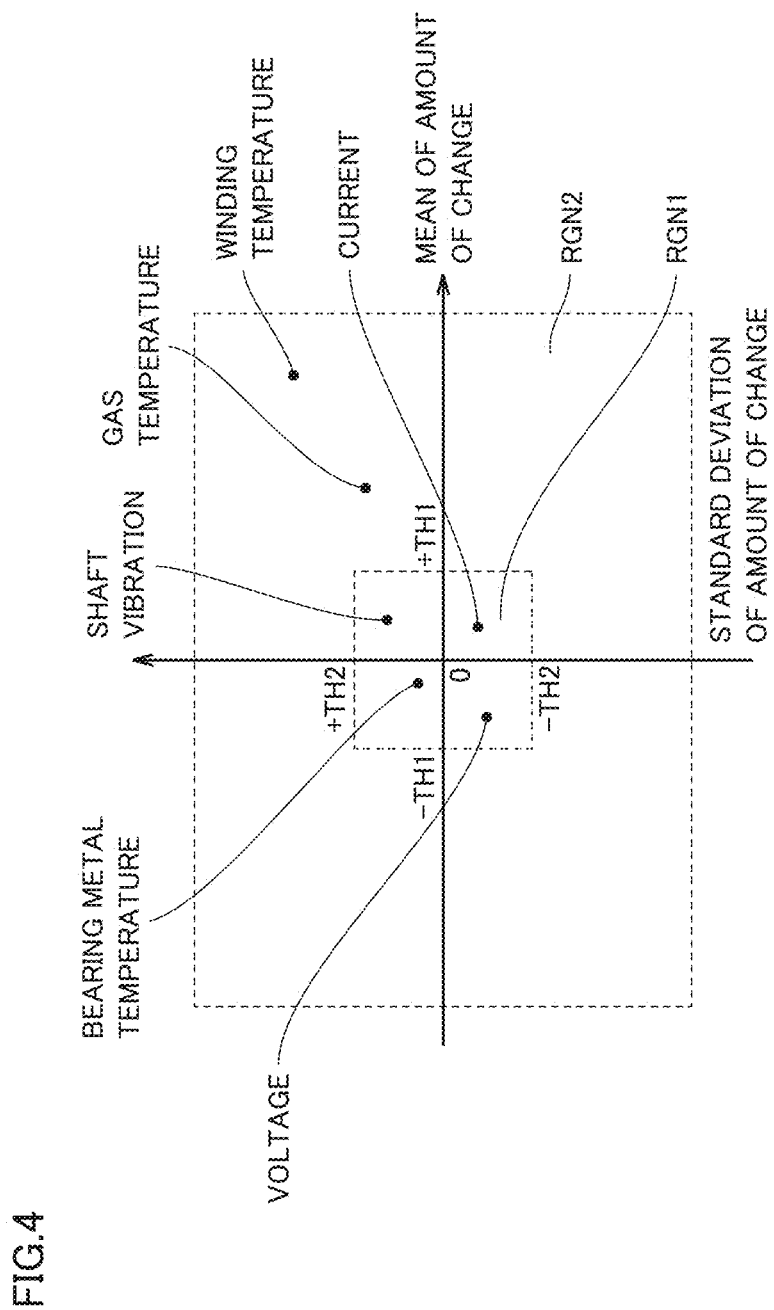
FIG. 4 is a diagram illustrating an example of a two-dimensional plot.

FIG. 4 is a diagram illustrating an example of how a result is displayed using a two-dimensional plot. In the two-dimensional plot illustrated in FIG. 4, a two-dimensional plane in which the amount of change in one feature X (for example, mean) is set as the horizontal axis, and the amount of change in another feature Y (for example, standard deviation) is set as the vertical axis is defined, and on this two-dimensional plane, a combination value of the amount of change in feature X and the amount of change in feature Y is plotted for each measurement item. Note that the amounts of change in features X, Y are both dimensionless numbers. In the example illustrated in FIG. 4, a combination value of the amount of change in mean and the amount of change in standard deviation for each of a total of six types of measurement items including a voltage, a current, a winding temperature, a gas temperature, a bearing metal temperature, and a shaft vibration of the generator.

As illustrated in FIG. 4, the two-dimensional plane is divided into two regions. A first region RGN1 includes an origin where the amounts of change in features X, Y are both zero, and is surrounded by a threshold range (−TH1 to +TH1) of the amount of change in feature X and a threshold range (−TH2 to +TH2) of the amount of change in feature Y. Note that "+TH1" indicates an upper limit value of the threshold range of the amount of change in feature X (mean), and "−TH1" indicates a lower limit value. "+TH2" indicates an upper limit value of the threshold range of the amount of change in feature Y (standard deviation), and "−TH2" indicates a lower limit value. A second region RGN2 is a region other than first region RGN1 and is a region surrounding first region RGN1.

First region RGN1 is a region indicating that both the amounts of change in feature X and feature Y are within the threshold range. Second region RGN2 is a region indicating that the amount of change in at least either feature X or feature Y falls outside the threshold range. That is, first region RGN1 is a region indicating that the measurement item is normal, and second region RGN2 is a region indicating that the measurement item is an abnormality cause.

In the example illustrated in FIG. 4, plot values of four measurement items of the voltage, the current, the bearing metal temperature, and the shaft vibration are within first region RG1. On the other hand, plot values of two measurement items of the gas temperature and the winding temperature are within second region RGN2. Therefore, abnormality cause identification unit 16 of second diagnosis unit 5 can identify the gas temperature and the winding temperature as the abnormality cause.

As illustrated in FIG. 4, plotting the amount of change in at least one feature of each of the plurality of measurement items allows a user to visually understand the amount of change in feature of the measurement item. Specifically, the user can infer the abnormality cause based on a position where the amount of change in feature of each measurement item is plotted. The user can further easily grasp, from a distance between the origin and the position where the measurement item inferred to be the abnormality cause is plotted, the amount of change in the measurement item at the time of the occurrence of the abnormality.

(A-7) Third Diagnosis Unit

Third diagnosis unit 6 diagnoses an abnormality mode to which the measurement item that is the abnormality cause contributes. That is, third diagnosis unit 6 serves as an "abnormality mode diagnosis unit" for diagnosing an abnormality mode indicating a phenomenon of an abnormality.

Herein, the abnormality mode refers to an abnormal phenomenon occurring in the equipment that is the diagnosis subject. For example, for a generator, the abnormality mode may include deterioration in insulation of stator winding, layer short of rotor winding, bearing wear, and the like. Note that the abnormality mode may include an abnormality mode to which a single measurement item contributes and an abnormality mode to which a plurality of measurement items contribute. When third diagnosis unit 6 identifies the abnormality mode, it is possible to determine whether to stop the operation of the equipment that is the diagnosis subject after the occurrence of the abnormality. Alternatively, a place where repair or inspection is required can be identified based on the abnormality mode thus identified. As described above, it is possible to examine an effective countermeasure against the abnormal phenomenon in accordance with the abnormality mode.

Third diagnosis unit 6 has a database. Each of a plurality of conceivable abnormal phenomena and a change amount vector corresponding to the abnormality phenomenon are associated with each other and registered in the database. Herein, the "change amount vector" is a vector indicating a change from the normal state to the abnormal state of the equipment and apparatus, and includes elements obtained based on the amount of change in feature before and after the occurrence of the abnormality of each measurement item. The value of each element may be the amount of change in any feature before and after the occurrence of the abnormality of each measurement item. Alternatively, the value of each element may be a value determined based on the amount of change in any feature. Alternatively, the value of each element may be a value determined based on a combination of the amounts of change in a plurality of any features.

After first diagnosis unit 4 determines that the equipment that is the diagnosis subject is abnormal, and second diagnosis unit 5 normalizes the multivariate time-series data, selects the evaluation region, and calculates the amount of change in feature, third diagnosis unit 6 generates the change amount vector based on the amount of change in feature. Then, third diagnosis unit 6 calculates a degree of similarity between the change amount vector thus generated and change amount vectors corresponding to the plurality of abnormal phenomena registered in the database, and identifies an abnormal phenomenon associated with a change amount vector that is high in degree of similarity as the abnormality mode.

Figure 5:
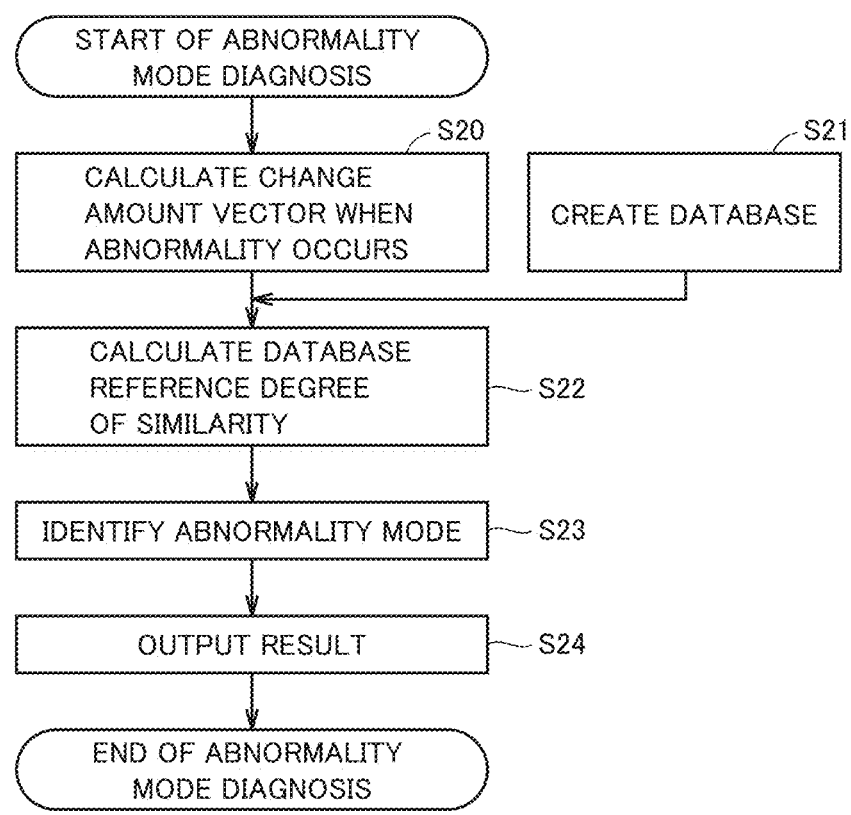
FIG. 5 is a flowchart for describing a process of diagnosing an abnormality mode performed by a third diagnosis unit.

Specifically, third diagnosis unit 6 includes a change amount vectorization unit 17, a database registration unit 18, a similarity degree calculation unit 19, and an abnormality mode identification unit 20. FIG. 5 is a flowchart for describing a process of diagnosing an abnormality mode performed by third diagnosis unit 6.

When the process of diagnosing an abnormality mode is started, change amount vectorization unit 17 first generates a change amount vector in step S20. The change amount vector can be generated based on the amount of change in feature that is a difference between the feature of the first section before the occurrence of the abnormality of each measurement item and the feature of the second section after the occurrence of the abnormality of each measurement item, the difference being calculated by feature change calculation unit 15 of second diagnosis unit 5.

Specifically, change amount vectorization unit 17 obtains values of elements constituting the change amount vector based on the amount of change in feature of each measurement item calculated by feature change calculation unit 15, and generates the change amount vector. The value of each element may be the amount of change in any feature before and after the occurrence of the abnormality of each measurement item. Alternatively, the value of each element may be a value obtained using the amount of change in any feature of each measurement item in accordance with a predetermined n-level (n is an integer) classification method. Alternatively, the value of each element may be a value obtained using a combination of the amounts of change in a plurality of any features of each measurement item in accordance with a predetermined m-level (m is an integer) classification method.

First, a case where the amount of change in any feature calculated by feature change calculation unit 15 is an element of the change amount vector will be described. In the following description, a case where time-series data of a total of six types of measurement items including a voltage, a current, a winding temperature, a gas temperature, a bearing metal temperature, and a shaft vibration of a generator is acquired, and abnormality diagnosis and abnormality mode diagnosis are performed will be given as an example. A case where the amount of change in mean is selected as the amount of change in feature will be described. When the amount of change in feature (mean) of the voltage is obtained as "−0.5", the amount of change in feature (mean) of the current is obtained as "0.5", the amount of change in feature (men) of the winding temperature is obtained as "2.0", the amount of change in feature (mean) of the gas temperature is obtained as "1.2", the amount of change in feature (mean) of the bearing metal temperature is obtained as "−02", and the amount of change in feature (men) of the shaft vibration is obtained as "0.6" by feature change calculation unit 15, the change amount vector can be obtained as (voltage, current, winding wire temperature, gas temperature, bearing metal temperature, shaft vibration)=(−0.5, 0.5, 2.0, 1.2, −0.2, 0.6). Here, the mean has been described as an example of the amount of change in feature, but the amount of change in feature may be of a different type.

Alternatively, the number of elements of the vector may be increased using the amounts of change in a plurality of features. Alternatively, the number of the amounts of change in the plurality of features may be reduced using principal component analysis or the like.

Next, a case where a value obtained using the amount of change in any feature calculated by feature change calculation unit 15 in accordance with the predetermined n-level classification method is used as an element of the vector will be described. For example, it can be determined to classify the amount of change in feature into n-level values based on preset thresholds. With thresholds of −0.8 and 0.8, the amount of change in feature is converted into discrete values classified into three: "−1" when the amount of change in feature is less than −0.8, "0" when the amount of change in feature falls within a range of −0.8 to 0.8 both inclusive, and "1" when the amount of change in feature is greater than 0.8. In this case, the change amount vector can be obtained as (voltage, current, winding temperature, gas temperature, bearing metal temperature, shaft vibration)=(0, 0, 1, 1, 0, 0). The classification number n, the thresholds serving as the classification criterion, and the converted value may be determined as desired. Here, the mean has been described as an example of the amount of change in feature, but the amount of change in feature may be of a different type. Alternatively, the number of elements of the vector may be increased using the amounts of change in a plurality of features. Alternatively, the number of the amounts of change in the plurality of features may be reduced using principal component analysis or the like.

Next, a case where a value obtained using a combination of the amounts of change in a plurality of any features calculated by feature change calculation unit 15 in accordance with the predetermined m-level classification method is used as an element of the vector will be described.

Figure 6:
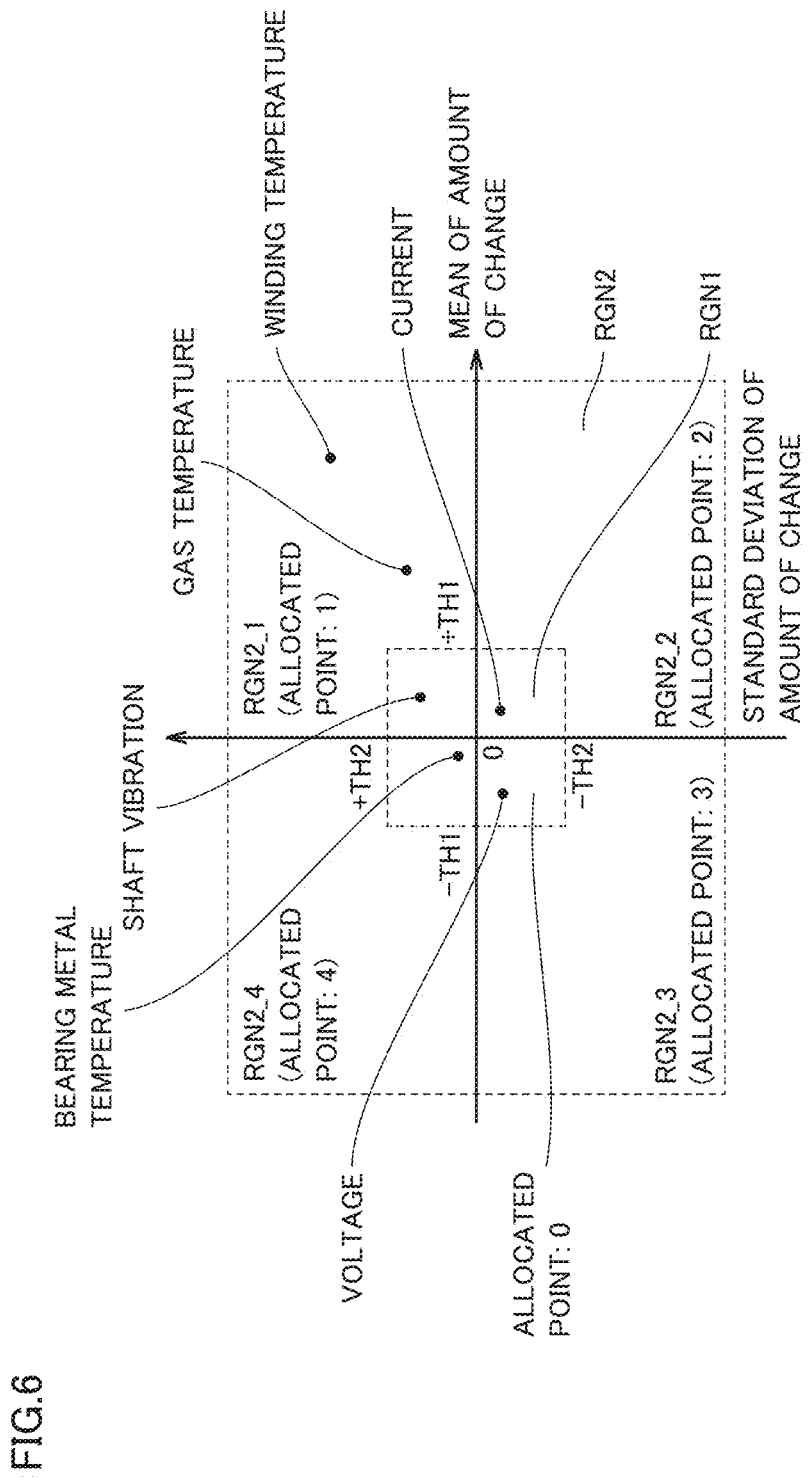
FIG. 6 is a diagram illustrating an example of a method for determining a value of each element of a change amount vector.

FIG. 6 is a diagram for describing an example of a method for determining a value of each element of the change amount vector in a case where a value obtained using a combination of the amounts of change in a plurality of any features in accordance with the predetermined n-level classification method is an element of the vector. FIG. 6 is based on the two-dimensional plot that is the display example of the abnormality cause determination result illustrated in FIG. 4.

Specifically, in the two-dimensional plane defined by the amount of change in feature X (mean) and the amount of change in feature Y (standard deviation), second region RGN2 (corresponding to a region indicating that the measurement item is an abnormality cause) is further divided into four regions RGN2_1 to RGN2_4. Region RGN2_1 is a region where both the amount of change in feature X and the amount of change in feature Y are positive. Region RGN2_2 is a region where the amount of change in feature X is positive, and the amount of change in feature Y is negative. Region RGN2_3 is a region where both the amount of change in feature X and the amount of change in feature Y are negative. Region RGN2_4 is a region where the amount of change in feature X is negative, and the amount of change in feature Y is positive.

Any value is allocated to first region RGN1 and each of the four regions RGN2_1 to RGN2_4 of second region RGN2. In FIG. 6, "0" is allocated to first region RGN1, "1" is allocated to region RGN2_1, "2" is allocated to region RGN2_2, "3" is allocated to region RGN2_3, and "4" is allocated to region RGN2_4 (each value indicated by an allocated point in FIG. 6). In this example, a combination of the amounts of change in two features of feature X (mean) and feature Y (standard deviation) is used for classification into five values. As described above, in FIG. 6, the classification method in which a region is divided into five regions, and the five levels of integers are each allocated to a corresponding one of the five regions has been given as an example, but the region division number m and the method for allocating the values may be selected as desired. Further, a region in a three-dimensional space may be divided by any division number using the amounts of change in three features. In the allocation of values, a value having no meaning in magnitude and order, such as a dummy variable, may be allocated.

As illustrated in FIG. 6, six measurement items plotted on the two-dimensional plane are each converted into a value allocated to a corresponding region where a corresponding plot is located. In the example illustrated in FIG. 6, the four measurement items of the voltage, the current, the bearing metal temperature, and the shaft vibration are each converted to "0" because their respective plot values are within first region RGN1. On the other hand, the two measurement items of the gas temperature and the winding temperature are each converted into "1" because their respective plot values are within region RGN2_1. In this example, the change amount vector (voltage, current, winding temperature, gas temperature, bearing metal temperature, shaft vibration) is (0, 0, 1, 1, 0, 0).

As described above, change amount vectorization unit 17 generates, for each measurement item, a change amount vector having, as an element, the amount of change in feature or the value obtained by converting the amount of change in feature based on the predetermined classification method.

In step S21 of FIG. 5, database registration unit 18 creates a database used for determining the abnormality mode. The database may be implemented in abnormality diagnosis device 1 or may be implemented in an external information processing device (for example, a server or the like) communicatively connected to abnormality diagnosis device 1.

Database registration unit 18 registers each of the plurality of abnormal phenomena and the change amount vector corresponding to the abnormal phenomenon in the database with the abnormal phenomenon and the change amount vector associated with each other. Specifically, database registration unit 18 can generate a change amount vector using multivariate time-series data acquired before and after the occurrence of a certain abnormal phenomenon, and register the change amount vector thus generated in the database with the change amount vector and the abnormal phenomenon associated with each other.

Alternatively, database registration unit 18 can generate a change amount vector by estimating the value of each element of the change amount vector even for an abnormal phenomenon that may occur as a phenomenon but multivariate time-series data before and after the occurrence of the abnormality has yet to be acquired, and register change amount vector in the database in advance with the abnormal phenomenon and the change amount vector associated with each other. Since an equipment characteristic and state vary for each equipment, it is difficult to estimate time-series data itself of each measurement item in the abnormal state with high accuracy. It is however relatively easy to infer whether the change in feature (mean, standard deviation, or the like) from the normal state to the abnormal state of each measurement item in a certain abnormal phenomenon is no change, a positive change, or a negative change based on a physical model or past findings (that is, to estimate the value of each element of the change amount vector from the physical model or past findings). This allows an abnormal phenomenon for which multivariate time-series data before and after the occurrence of the abnormality has yet to be acquired to be registered in the database.

An example where a change amount vector of an abnormal phenomenon is estimated based on the physical model or past findings and registered in the database will be described. For example, it is known that in an abnormality of layer short of a rotor coil of a generator, a field current and shaft vibration increase, and resistance decreases (that is, the winding temperature decreases). It is therefore possible to generate a change amount vector indicating a change in which the means of at least two measurement items of the field current and the shaft vibration increase, and the mean of the winding temperature decreases, and register the change amount vector in the database with the change amount vector and the layer short of the rotor coil associated with each other.

Likewise, for other abnormal phenomena, it is possible to estimate a change amount vector by estimating a measurement item that changes before and after the occurrence of a certain abnormal phenomenon, the feature of the measurement item, and the amount of change in the feature based on the physical model or past findings and register the change amount vector corresponding to the abnormal phenomenon in the database with the change amount vector and the abnormal phenomenon associated with each other.

Another example of the method for generating a change amount vector of an abnormal phenomenon having no actually measured multivariate time-series data (actually measured multivariate time-series data has yet to be acquired) and registering the change amount vector in the database is a method in which a change amount vector generated from actually acquired multivariate time-series data before and after the occurrence of an abnormality and a database in similar equipment are reused.

When the method is described using a generator as an example, a change amount vector of an abnormal phenomenon a of a generator A is obtained from multivariate time-series data before and after the occurrence of the abnormal phenomenon a, and a change amount vector of an abnormal phenomenon b of a generator B is obtained from multivariate time-series data before and after the occurrence of the abnormal phenomenon b. Such abnormal phenomena a, b and their respective change amount vectors can be registered in a database for diagnosing an abnormality mode of another generator C. That is, a change amount vector and an abnormal phenomenon of similar equipment can be registered in the same database, and the abnormality mode diagnosis of the similar equipment can be performed using the database.

Note that, when a change amount vector generated from multivariate time-series data of similar but different equipment is registered in the same database, the normalization of the multivariate time-series data at the time of generating the change amount vector can be performed based on a reference value different for each equipment. Further, it is desirable that, for the generation of the change amount vector, the elements (measurement items) constituting the change amount vector and the method for obtaining the value of each element (the amount of change in feature to be used and the classification method) be the same.

The generator has absolute values of measurement items such as a voltage, a current, and a winding temperature that differ from each other in a manner that depends on the influence of equipment or installation environment. Therefore, a database in which not a change amount vector indicating a change from normal to abnormal but an abnormal state itself (for example, vectorized abnormal state) is registered with the abnormal state and the abnormal phenomenon associated with each other, the database being used in certain equipment, cannot be reused for diagnosis of another generator. However, registering the change amount vector indicating the change in the amount of feature from the normal state to the abnormal state in the database eliminates the need of information unique to equipment and thus allows the change amount vector generated from the multivariate time-series data and the database acquired from the similar equipment to be reused.

As described above, the method for estimating the change amount vector based on the physical model or past findings, and the method for generating the change amount vector using the multivariate time-series data before and after the occurrence of the abnormality in similar equipment allow a diagnosis to be made using a database in which the number of records sufficient to diagnose the abnormality mode even for equipment and apparatus in which an abnormality rarely occurs is registered.

FIG. 7 is a diagram illustrating an example of the database. As illustrated in FIG. 7, a change amount vector is registered in the database for each of a plurality of abnormal phenomena a to f, . . . . Not that the change amount vectors shown in FIG. 7 are generated in the same manner as the change amount vectors shown in FIG. 6.

For example, a change amount vector (voltage, current, winding temperature, gas temperature, bearing metal temperature, shaft vibration)=(1, 1, 1, 1, 0, 4) is registered for the abnormal phenomenon a. A change amount vector (voltage, current, winding temperature, gas temperature, bearing metal temperature, shaft vibration)=(0, 0, 1, 1, 0, 0) is registered for the abnormal phenomenon b.

In step S22 of FIG. 5, similarity degree calculation unit 19 compares the change amount vector of each abnormal phenomenon registered in the database (FIG. 7) with a change amount vector of an unknown abnormal phenomenon generated in step S20 to calculate a degree of similarity between the two change amount vectors. The degree of similarity can be calculated using any known method in a manner that depends on a measure of an element of the generated change amount vector such as cosine similarity, Pearson's correlation coefficient, Euclidean distance, Spearman's rank correlation coefficient, or Cramer's association coefficient.

In step S23, abnormality mode identification unit 20 identifies an abnormality mode based on the degree of similarity calculated by similarity degree calculation unit 19. Specifically, abnormality mode identification unit 20 can identify, as the abnormality mode, an abnormal phenomenon that has the highest degree of similarity among the plurality of degrees of similarity of the plurality of abnormal phenomena registered in the database. Alternatively, abnormality mode identification unit 20 can identify, as the abnormality mode, an abnormal phenomenon that has a higher degree of similarity than a preset threshold among the plurality of degrees of similarity. Therefore, in a case where there are two or more degrees of similarity higher than the threshold, two or more abnormal phenomena are identified as candidates of the abnormality mode.

(A-8) Third Output Unit

In step S24, third output unit 9 outputs a result of the determination made by abnormality mode identification unit 20 of third diagnosis unit 6. Third output unit 9 includes, for example, a display unit, and displays the determination result on the display unit. Third output unit 9 may be further structured to transmit the determination result to an external device using a communication unit (not illustrated).

FIG. 8 is a diagram illustrating an output example of the result of the determination made by third output unit 9. The example illustrated in FIG. 8 shows a degree of similarity of the change amount vector of the unknown abnormal phenomenon to each of the change amount vectors of the plurality of abnormal phenomena a to f, . . . registered in the database (see FIG. 7). In the table shown in FIG. 8, the plurality of abnormal phenomena a to f, . . . may be arranged in descending order of the degree of similarity.

Further, as a result of the abnormality mode diagnosis, when the degree of similarity is low with respect to any abnormal phenomenon registered in the database, it is highly likely that the phenomenon is other than the abnormal phenomena registered in the database, and the phenomenon and the change amount vector can be newly registered in the database. Further, for a phenomenon to be registered in the database, a change amount vector is generated from not only the abnormal phenomenon but also multivariate time-series data acquired from equipment before and after the occurrence of any event such as maintenance or inspection, and the change amount vector can be registered in the database with the change amount vector associated with the name of the event. As described above, the database can be further enriched by addition to and correction of the database as necessary.

As described above, when first diagnosis unit 4 determines that the equipment that is the diagnosis subject is abnormal, second diagnosis unit 5 and third diagnosis unit 6 diagnose the abnormality cause and the abnormality mode, respectively.

B. Example of Hardware Structure of Abnormality Diagnosis Device

Next, an example of the hardware structure of abnormality diagnosis device 1 according to the present embodiment will be described.

Figure 9:
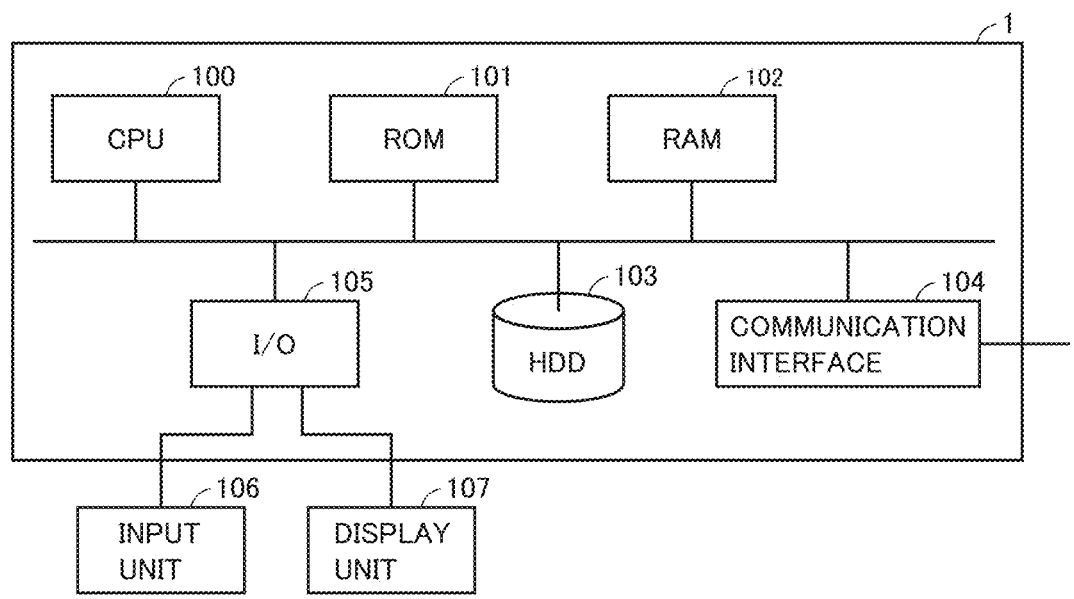
FIG. 9 is a block diagram illustrating an example of a hardware structure of the abnormality diagnosis device according to the embodiment.

FIG. 9 is a block diagram illustrating an example of the hardware structure of abnormality diagnosis device 1 illustrated in FIG. 1. Referring to FIG. 9, abnormality diagnosis device 1 includes a central processing unit (CPU) 100 and a memory that stores a program and data, and CPU 100 operates in accordance with the program to implement the functional structure illustrated in FIG. 1.

The memory includes a read only memory (ROM) 101, a random access memory (RAM) 102, and a hard disk drive (HDD) 103. ROM 101 can store the program to be executed by CPU 100. RAM 102 can temporarily store data used during execution of the program by CPU 100 and can serve as a temporary data memory used as a work area. HDD 103 is a nonvolatile storage device, and can store data read by data reader 2, results of determination made by first diagnosis unit 4, second diagnosis unit 5, and third diagnosis unit 6, and the like. In addition to or instead of the HDD, a semiconductor storage device such as a flash memory may be used.

Abnormality diagnosis device 1 further includes a communication interface (I/F) 104, an input/output (I/O) interface 105, an input unit 106, and a display unit 107. Communication interface 104 is an interface for abnormality diagnosis device 1 to communicate with an external apparatus including the equipment that is the diagnosis subject. Communication interface 104 corresponds to an example of "data reader 2".

I/O interface 105 is an interface for input to abnormality diagnosis device 1 or output from abnormality diagnosis device 1. As illustrated in FIG. 9, I/O interface 105 is connected to input unit 106 and display unit 107.

Input unit 106 receives, from the user, input containing a command directed to abnormality diagnosis device 1. Input unit 106 includes a keyboard, a mouse, a touchscreen provided together with a display screen of the display unit, and the like and receives parameter settings used by first diagnosis unit 4, second diagnosis unit 5, and third diagnosis unit 6.

Display unit 107 corresponds to an example of "data display unit 3", "first output unit 7", "second output unit 8", and "third output unit 9". Display unit 107 can display the multivariate time-series data acquired from the equipment that is the diagnosis subject, the results of determination made by first diagnosis unit 4, second diagnosis unit 5, and third diagnosis unit 6, and the like.

Note that although the example of the hardware structure of abnormality diagnosis device 1 is illustrated in FIG. 9, a different structure may be employed. For example, a plurality of CPUs may be provided. First diagnosis unit 4, second diagnosis unit 5, and third diagnosis unit 6 may be implemented as a dedicated circuit such as an application specific integrated circuit (ASIC) or a field programmable gate array (FPGA). Alternatively, first diagnosis unit 4, second diagnosis unit 5, and third diagnosis unit 6 may be implemented by a suitable combination of at least two of a CPU, an ASIC, and an FPGA.

C. Operations and Effects

As described above, abnormality diagnosis device 1 according to the present embodiment diagnoses a measurement item that is an abnormality cause based on the feature extracted from the multivariate time-series data of the first section before the occurrence of the abnormality, the feature extracted from the multivariate time-series data of the second section after the occurrence of the abnormality, and the amount of change in feature that is a difference between the feature of the first section and the feature of the second section which are obtained by a common feature extraction method. Further, for each measurement item, a change amount vector having, as an element, (i) the amount of change in feature, (ii) a value obtained using the amount of change in feature in accordance with the predetermined n-level classification method, or (iii) a value obtained using a combination of the plurality of amounts of change in features extracted by different feature extraction methods from each other in accordance with the predetermined m-level classification method is generated, and an unknown abnormality mode is diagnosed based on the change amount vector thus generated and the database in which various abnormal phenomena are registered. Such a configuration makes it possible to diagnose the abnormality cause and the abnormality mode with high accuracy in a short time without requiring specialized knowledge and skills for the equipment that is the diagnosis subject.

Second Embodiment

In the first embodiment, the method for diagnosing the abnormality cause when first diagnosis unit 4 (abnormality diagnosis unit) determines that there is an abnormality and subsequently diagnosing the abnormality mode has been described. A configuration where, when first diagnosis unit 4 determines that there is an abnormality, only the abnormality mode is diagnosed without identifying a measurement item that is the abnormality cause (abnormality cause diagnosis) will be described below.

First, as described in the first embodiment, first diagnosis unit 4 determines whether there is an abnormality, and diagnoses the abnormality mode when the state is determined to be abnormal. This allows third diagnosis unit 6 (abnormality mode diagnosis unit) to be implemented by a combination of a function of second diagnosis unit 5 without abnormality cause identification unit 16 and a function of third diagnosis unit 6. Specifically, third diagnosis unit 6 can include data normalization unit 13, evaluation region selection unit 14, feature change calculation unit 16, change amount vectorization unit 17, database registration unit 18, similarity degree calculation unit 19, and abnormality mode identification unit 20. The calculation processing of each function can be performed using the same method as in the first embodiment.

It should be understood that the embodiments disclosed herein are illustrative in all respects and not restrictive. The scope of the present disclosure is defined by the claim rather than the above description and is intended to include the claims, equivalents of the claims, and all modifications within the scope.

REFERENCE SIGNS LIST

1: abnormality diagnosis device, 2: data reader, 3: data display unit 4: first diagnosis unit, 5: second diagnosis unit, 6: third diagnosis unit, 7: first output unit, 8: second output unit, 9: third output unit, 10: model creating unit, 11: analysis output value calculation unit, 12: abnormality determination unit, 13: data normalization unit, 14: evaluation region selection unit, 15: feature change calculation unit, 16: abnormality cause identification unit, 17: change amount vectorization unit, 18: database registration unit, 19: similarity degree calculation unit, 20: abnormality mode identification unit, 100: CPU, 101: ROM, 102: RAM, 103: HDD, 104: communication interface, 105: I/O interface, 106: input unit, 107: display unit

The invention claimed is:

1. An abnormality diagnosis method for diagnosing an abnormality in equipment that is a diagnosis subject, the abnormality diagnosis method comprising:
   acquiring multivariate time-series data for a plurality of measurement items from the equipment;
   diagnosing an abnormality in operational state of the equipment based on the multivariate time-series data; and
   diagnosing, when the abnormality in the operational state of the equipment is determined in the diagnosing an abnormality, a cause of the abnormality, wherein
   the diagnosing a cause of the abnormality includes:
   extracting a feature of a first section before the occurrence of the abnormality from the multivariate time-series data of the first section for each of the measurement items by at least one feature extraction method;

extracting a feature of a second section after the occurrence of the abnormality from the multi variate time-series data of the second section for each of the measurement items by the at least one feature extraction method;

obtaining an amount of change in feature from a difference between the feature of the first section and the feature of the second section which are obtained by a common feature extraction method; and diagnosing a measurement item that is the cause of the abnormality based on the amounts of change in features of the plurality of measurement items, wherein in the diagnosing an abnormality, a learned model serving as a criterion for diagnosis is created using the multi variate time-series data, and the abnormality in the operational state of the equipment is diagnosed based on the learned model, in the extracting a feature of a first section, the feature of the first section is extracted from data obtained by normalizing the multivariate time-series data of the first section based on the learned model, and in the extracting a feature of a second section, the feature of the second section is extracted from data obtained by normalizing the multivariate time-series data of the second section based on the learned model.

2. The abnormality diagnosis method according to claim 1, further comprising diagnosing, when the abnormality in the operational state of the equipment is determined in the diagnosing an abnormality, an abnormality mode indicating a phenomenon of the abnormality, wherein the diagnosing an abnormality mode includes:

generating a change amount vector having, as an element, (i) the amount of change in feature of each of the measurement items, (ii) a value obtained using the amount of change in feature in accordance with a predetermined n-level (n is an integer) classification method, or (iii) a value obtained using a plurality of the amounts of change in features extracted by different feature extraction methods from each other in accordance with a predetermined m-level (m is an integer) classification method;

creating a database in which each of a plurality of abnormal phenomena and a change amount vector corresponding to the abnormal phenomenon are registered with the abnormal phenomenon and the change amount vector associated with each other; and diagnosing an unknown abnormality mode based on the database and the change amount vector generated in the generating.

3. An abnormality diagnosis method for diagnosing an abnormality in equipment that is a diagnosis subject, the abnormality diagnosis method comprising:

acquiring multivariate time-series data for a plurality of measurement items from the equipment;

diagnosing an abnormality in operational state of the equipment based on the multivariate time-series data; and diagnosing, when the abnormality in the operational state of the equipment is determined in the diagnosing an abnormality, an abnormality mode indicating a phenomenon of the abnormality, wherein the diagnosing an abnormality mode includes:

extracting a feature of a first section before the determination of the abnormality from the multivariate time-series data of the first section for each of the measurement items by at least one feature extraction method;

extracting a feature of a second section after the determination of the abnormality from the multivariate time-series data of the second section for each of the measurement items by the at least one feature extraction method;

obtaining an amount of change in feature from a difference between the feature of the first section and the feature of the second section which are obtained by a common feature extraction method;

generating a change amount vector having, as an element, (i) the amount of change in feature of each of the measurement items, (ii) a value obtained using the amount of change in feature in accordance with a predetermined n-level (n is an integer) classification method, or (iii) a value obtained using a plurality of the amounts of change in features extracted by different feature extraction methods from each other in accordance with a predetermined m-level (m is an integer) classification method;

creating a database in which each of a plurality of abnormal phenomena and a change amount vector corresponding to the abnormal phenomenon are registered with the abnormal phenomenon and the change amount vector associated with each other; and diagnosing an unknown abnormality mode based on the database and the change amount vector generated in the generating.

4. The abnormality diagnosis method according to claim 3, wherein in the diagnosing an abnormality, a learned model serving as a criterion for diagnosis is created using the multivariate time-series data, and the abnormality in the operational state of the equipment is diagnosed based on the learned model, in the extracting a feature of a first section, the feature of the first section is extracted from data obtained by normalizing the multivariate time-series data of the first section based on the learned model, and in the extracting a feature of a second section, the feature of the second section is extracted from data obtained by normalizing the multivariate time-series data of the second section based on the learned model.

5. The abnormality diagnosis method according to claim 2, wherein in the diagnosing an unknown abnormality mode, the unknown abnormality mode is diagnosed based on a degree of similarity between the change amount vector of each of the plurality of abnormal phenomena registered in the database and the change amount vector generated in the generating.

6. The abnormality diagnosis method according to claim 2, wherein in the creating a database, as a method for generating the change amount vector to be registered in the database, at least one of (i) a method for generating the change amount vector using the multivariate time-series data before and after the occurrence of the abnormality acquired from the equipment, (ii) a method for generating the change amount vector by estimating the amount of change in feature based on a physical model of abnormal phenomena or past findings, and (iii) a method for generating the change amount vector using the multivariate time-series data before and after occurrence of an abnormality acquired from similar equipment is used, and the change amount vector generated is registered in the database in association with a corresponding abnormal phenomenon.

7. The abnormality diagnosis method according to claim 1, wherein the at least one feature extraction method corresponds to a process of obtaining at least one of a mean, a variance, a standard deviation, a median, a mode, a maximum, a minimum, a skewness, and a kurtosis.

8. An abnormality diagnosis device that diagnoses an abnormality in equipment that is a diagnosis subject, the abnormality diagnosis device comprising:
a data reader to acquire multivariate time-series data for a plurality of measurement items from the equipment;
abnormality diagnosis circuitry to diagnose an abnormality in operational state of the equipment based on the multivariate time-series data; and
abnormality cause diagnosis circuitry to diagnose, when the abnormality in the operational state of the equipment is determined by the abnormality diagnosis circuitry, a cause of the abnormality, wherein
the abnormality cause diagnosis circuitry
extracts a feature of a first section before the occurrence of the abnormality from the multivariate time-series data of the first section for each of the measurement items by at least one feature extraction method,
extracts a feature of a second section after the occurrence of the abnormality from the multivariate time-series data of the second section for each of the measurement items by the at least one feature extraction method,
obtains an amount of change in feature from a difference between the feature of the first section and the feature of the second section which are obtained by a common feature extraction method, and
diagnoses a measurement item that is the cause of the abnormality based on the amounts of change in features of the plurality of measurement items, wherein
the abnormality diagnosis circuitry
creates a learned model serving as a criterion for diagnosis using the multivariate time-series data, and
diagnoses the abnormality in the operational state of the equipment based on the learned model, and
the abnormality cause diagnosis circuitry
extracts the feature of the first section from data obtained by normalizing the multivariate time-series data of the first section based on the learned model, and
extracts the feature of the second section from data obtained by normalizing the multivariate time-series data of the second section based on the learned model.

9. The abnormality diagnosis device according to claim 8, further comprising abnormality mode diagnosis circuitry to diagnose, when the abnormality in the equipment is diagnosed by the abnormality diagnosis circuitry, an abnormality mode indicating a phenomenon of the abnormality, wherein
the abnormality mode diagnosis circuitry
generates a change amount Vector having, as an element, (i) the amount of change in feature of each of the measurement items, (ii) a value obtained using the amount of change in feature in accordance with a predetermined n-level (n is an integer) classification method, or (iii) a value obtained using a plurality of the amounts of change in features extracted by different feature extraction methods from each other in accordance with a predetermined m-level (m is an integer) classification method,
creates a database in which each of a plurality of abnormal phenomena and a change amount vector corresponding to the abnormal phenomenon are registered with the abnormal phenomenon and the change amount vector associated with each other, and
diagnoses an unknown abnormality mode based on the database and the change amount vector generated in the generating.

10. An abnormality diagnosis device that diagnoses an abnormality in equipment that is a diagnosis subject, the abnormality diagnosis device comprising:
a data reader to acquire multivariate time-series data for a plurality of measurement items from the equipment;
abnormality diagnosis circuitry to diagnose an abnormality in operational state of the equipment based on the multivariate time-series data; and
abnormality mode diagnosis circuitry to diagnose, when the abnormality in the operational state of the equipment is determined by the abnormality diagnosis circuitry, an abnormality mode indicating a phenomenon of the abnormality, wherein
the abnormality diagnosis circuitry
extracts a feature of a first section before the occurrence of the abnormality from the multi variate time-series data of the first section for each of the measurement items by at least one feature extraction method,
extracts a feature of a second section after the occurrence of the abnormality from the multivariate time-series data of the second section for each of the measurement items by the at least one feature extraction method,
obtains an amount of change in feature from a difference between the feature of the first section and the feature of the second section which are obtained by a common feature extraction method,
generates a change amount vector having, as an element, (i) the amount of change in feature of each of the measurement items, (ii) a value obtained using the amount of change in feature in accordance with a predetermined n-level (n is an integer) classification method, or (iii) a value obtained using a plurality of the amounts of change in features extracted by different feature extraction methods from each other in accordance with a predetermined m-level (m is an integer) classification method,
creates a database in which each of a plurality of abnormal phenomena and a change amount vector corresponding to the abnormal phenomenon are registered with the abnormal phenomenon and the change amount vector associated with each other, and
diagnoses an unknown abnormality mode based on the database and the change amount vector generated in the generating.

11. The abnormality diagnosis device according to claim 10, wherein
the abnormality diagnosis circuitry
creates a learned model serving as a criterion for diagnosis using the multivariate time-series data, and
diagnoses the abnormality in the operational state of the equipment based on e learned model, and
the abnormality mode diagnosis circuitry
extracts the feature of the first section from data obtained by normalizing the multivariate time-series data of the first section based on the learned model, and
extracts the feature of the second section from data obtained by normalizing the multivariate time-series data of the second section based on the learned model.

12. The abnormality diagnosis device according to claim 9, wherein the abnormality mode diagnosis circuitry diagnoses the unknown abnormality mode based on a degree of similarity between the change amount vector of each of the plurality of abnormal phenomena registered in the database and the change amount vector generated.

13. The abnormality diagnosis device according to claim 9, wherein the abnormality mode diagnosis circuitry
uses, as a method for generating the change amount vector to be registered in the database, at least one of (i) a method for generating the change amount vector using the multivariate time-series data before and after the occurrence of the abnormality acquired from the equipment, (ii) a method for generating the change amount vector by estimating the amount of change in feature based on a physical model of abnormal phenomena or past findings, and (iii) a method for generating the change amount vector using the multivariate time-series data before and after occurrence of an abnormality acquired from similar equipment, and
registers the change amount vector generated in the database in association with a corresponding abnormal phenomenon.

14. The abnormality diagnosis device according to claim 8, wherein the at least one feature extraction method corresponds to a process of obtaining at least one of a mean, a variance, a standard deviation, a median, a mode, a maximum, a minimum, a skewness, and a kurtosis.

15. A non-transitory computer readable storage medium storing an abnormality diagnosis program for causing a computer to execute a process of diagnosing an abnormality in equipment that is a diagnosis subject, the abnormality diagnosis program causing the computer to execute:
acquiring multivariate time-series data for a plurality of measurement items from the equipment;
diagnosing an abnormality in operational state of the equipment based on the multivariate time-series data; and
diagnosing, when the abnormality in the operational state of the equipment is determined in the diagnosing an abnormality, a cause of the abnormality, wherein
the diagnosing a cause of the abnormality includes:
extracting a feature of a first section before the occurrence of the abnormality from the multivariate time-series data of the first section for each of the measurement items by at least one feature extraction method;
extracting a feature of a second section after the occurrence of the abnormality from the multivariate time-series data of the second section for each of the measurement items by the at least one feature extraction method;
obtaining an amount of change in feature from a difference between the feature of the first section and the feature of the second section which are obtained by a common feature extraction method; and
diagnosing a measurement item that is the cause of the abnormality based on the amounts of change in features of the plurality of measurement items, wherein
in the diagnosing an abnormality, a learned model serving as a criterion for diagnosis is created using the multivariate time-series data, and the abnormality in the operational state of the equipment is diagnosed based on the learned model,
in the extracting a feature of a first section, the feature of the first section is extracted from data obtained by normalizing the multivariate time-series data of the first section based on the learned model, and
in the extracting a feature of a second section, the feature of the second section is extracted from data obtained by normalizing the multivariate time-series data of the second section based on the learned model.

16. The non-transitory computer readable storage medium according to claim 15, further causing the computer to execute diagnosing, when the abnormality in the operational state of the equipment is determined in the diagnosing an abnormality, an abnormality mode indicating a phenomenon of the abnormality, wherein
the diagnosing an abnormality mode includes:
generating a change amount vector having, as an element, (i) the amount of change in feature of each of the measurement items, (ii) a value obtained using the amount of change in feature in accordance with a predetermined n-level (n is an integer) classification method, or (iii) a value obtained using a plurality of the amounts of change in features extracted by different feature extraction methods from each other in accordance with a predetermined m-level (m is an integer) classification method;
creating a database in which each of a plurality of abnormal phenomena and a change amount vector corresponding to the abnormal phenomenon are registered with the abnormal phenomenon and the change amount vector associated with each other; and
diagnosing an unknown abnormality mode based on the database and the change amount vector generated in the generating.

17. A non-transitory computer readable storage medium storing an abnormality diagnosis program for causing a computer to execute a process of diagnosing an abnormality in equipment that is a diagnosis subject, the abnormality diagnosis program causing the computer to execute:
acquiring multivariate time-series data for a plurality of measurement items from the equipment;
diagnosing an abnormality in operational state of the equipment based on the multivariate time-series data; and
diagnosing, when the abnormality in the operational state of the equipment is determined in the diagnosing an abnormality, an abnormality mode indicating a phenomenon of the abnormality, wherein
the diagnosing an abnormality mode includes:
extracting a feature of a first section before the determination of the abnormality from the multivariate time-series data of the first section for each of the measurement items by at least one feature extraction method;
extracting a feature of a second section after the determination of the abnormality from the multivariate time-series data of the second section for each of the measurement items by the at least one feature extraction method;
obtaining an amount of change in feature from a difference between the feature of the first section and the feature of the second section which are obtained by a common feature extraction method;
generating a change amount vector having, as an element, (i) the amount of change in feature of each of the measurement items, (ii) a value obtained using the amount of change in feature in accordance with a predetermined n-level (n is an integer) classification method, or (iii) a value obtained using a plurality of the amounts of change in features extracted by different feature extraction methods from each other in accordance with a predetermined m-level (m is an integer) classification method;
creating a database in which each of a plurality of abnormal phenomena and a change amount vector corresponding to the abnormal phenomenon are registered with the abnormal phenomenon and the change amount vector associated with each other; and diagnosing an unknown abnormality mode based on the database and the change amount vector generated in the generating.

18. An abnormality diagnosis method for diagnosing an abnormality in equipment that is a diagnosis subject, the abnormality diagnosis method comprising:

acquiring multivariate time-series data for a plurality of measurement items from the equipment;

diagnosing an abnormality in operational state of the equipment based on the multivariate time-series data; and diagnosing, when the abnormality in the operational state of the equipment is determined in the diagnosing an abnormality, a cause of the abnormality, wherein the diagnosing a cause of the abnormality includes:

extracting a feature of a first section before the occurrence of the abnormality from the multivariate time-series data of the first section for each of the measurement items by at least one feature extraction method;

extracting a feature of a second section after the occurrence of the abnormality from the multivariate time-series data of the second section for each of the measurement items by the at least one feature extraction method;

obtaining an amount of change in feature from a difference between the feature of the first section and the feature of the second section which are obtained by a common feature extraction method; and diagnosing a measurement item that is the cause of the abnormality based on the amounts of change in features of the plurality of measurement items, wherein the abnormality diagnosis method further comprising diagnosing, when the abnormality in the operational state of the equipment is determined in the diagnosing an abnormality, an abnormality mode indicating a phenomenon of the abnormality, wherein the diagnosing an abnormality mode includes:

generating a change amount vector having, as an element, (i) the amount of change in feature of each of the measurement items, (ii) a value obtained using the amount of change in feature in accordance with a predetermined n-level (n is an integer) classification method, or (iii) a value obtained using a plurality of the amounts of change in features extracted by different feature extraction methods from each other in accordance with a predetermined in-level (m is an integer) classification method;

creating a database in which each of a plurality of abnormal phenomena and a change amount vector corresponding to the abnormal phenomenon are registered with the abnormal phenomenon and the change amount vector associated with each other; and diagnosing an unknown abnormality mode based on the database and the change amount vector generated in the generating.

19. An abnormality diagnosis device that diagnoses an abnormality in equipment that is a diagnosis subject, the abnormality diagnosis device comprising:

a data reader to acquire multivariate time-series data for a plurality of measurement items from the equipment;

abnormality diagnosis circuitry to diagnose an abnormality in operational state of the equipment based on the multivariate time-series data; and abnormality cause diagnosis circuitry to diagnose, when the abnormality in the operational state of the equipment is determined by the abnormality diagnosis circuitry, a cause of the abnormality, wherein the abnormality cause diagnosis circuitry extracts a feature of a first section before the occurrence of the abnormality from the multivariate time-series data of the first section for each of the measurement items by at least one feature extraction method, extracts a feature of a second section after the occurrence of the abnormality from the multivariate time-series data of the second section for each of the measurement items by the at least one feature extraction method, obtains an amount of change in feature from a difference between the feature of the first section and the feature of the second section which are obtained by a common feature extraction method, and diagnoses a measurement item that is the cause of the abnormality based on the amounts of change in features of the plurality of measurement items, wherein the abnormality diagnosis device further comprising an abnormality mode diagnosis circuitry to diagnose, when the abnormality in the equipment is diagnosed by the abnormality diagnosis circuitry, an abnormality mode indicating a phenomenon of the abnormality, wherein the abnormality mode diagnosis circuitry generates a change amount vector having, as an element, (i) the amount of change in feature of each of the measurement items, (ii) a value obtained using the amount of change in feature in accordance with a predetermined n-level (n is an integer) classification method, or (iii) a value obtained using a plurality of the amounts of change in features extracted by different feature extraction methods from each other in accordance with a predetermined m-level (m is an integer) classification method, creates a database in which each of a plurality of abnormal phenomena and a change amount vector corresponding to the abnormal phenomenon are registered with the abnormal phenomenon and the change amount vector associated with each other, and diagnoses an unknown abnormality mode based on the database and the change amount vector generated in the generating.

* * * * *